United States Patent [19]

Burgess et al.

[11] Patent Number: 5,072,365
[45] Date of Patent: Dec. 10, 1991

[54] DIRECT MEMORY ACCESS CONTROLLER USING PRIORITIZED INTERRUPTS FOR VARYING BUS MASTERSHIP

[75] Inventors: Bradley G. Burgess; James B. Eifert; John P. Dunn, all of Austin, Tex.

[73] Assignee: Motorola, Inc., Schaumburg, Ill.

[21] Appl. No.: 457,647

[22] Filed: Dec. 27, 1989

[51] Int. Cl.[5] ............................................. G06F 13/34
[52] U.S. Cl. .............................. 395/725; 364/240.5; 364/240.7; 364/241.4; 364/241.5; 364/242.31; 364/DIG. 1
[58] Field of Search ................................ 364/200, 900

[56] References Cited

U.S. PATENT DOCUMENTS

| | | | |
|---|---|---|---|
| 4,023,143 | 5/1977 | Braunstein | 340/172.5 |
| 4,035,780 | 7/1977 | Kristick | 364/900 |
| 4,067,059 | 1/1978 | Perchak | 364/200 |
| 4,200,912 | 4/1980 | Harrington et al. | 364/200 |
| 4,240,140 | 12/1980 | Stafford et al. | 364/200 |
| 4,257,095 | 3/1981 | Nadir | 364/200 |
| 4,443,848 | 4/1984 | Gehman | 364/200 |
| 4,755,938 | 7/1988 | Takahashi | 364/200 |
| 4,953,103 | 8/1990 | Suzuki | 364/519 |

Primary Examiner—Dale M. Shaw
Assistant Examiner—Andrew Bodendorf
Attorney, Agent, or Firm—Robert L. King

[57] ABSTRACT

A data processing system having a direct memory access controller (DMAC) which can be interrupted with a prioritized signal to vary bus mastership of a communication bus in the system. A prioritized interrupt signal is sent to a CPU when the DMAC has bus mastership. The CPU only informs the DMAC of the highest priority cumulative interrupt priority. With the use of a mask value, the interrupt may be selectively screened by the DMAC so that selective interrupts may remove bus mastership from the DMAC.

8 Claims, 1 Drawing Sheet

DIRECT MEMORY ACCESS CONTROLLER USING PRIORITIZED INTERRUPTS FOR VARYING BUS MASTERSHIP

TECHNICAL FIELD

This invention relates to data processors, and more particularly, to interrupt mechanisms of a data processing system.

BACKGROUND OF THE INVENTION

In known data processing systems, various circuit modules are coupled to a central communication bus for communicating operands between the circuit modules. To avoid communication bus conflicts and data collisions, a bus master is acknowledged in the system. The bus master typically is given exclusive use privileges of the communication bus. Therefore, an arbitration mechanism exists for establishing a bus priority and implementing the priority. Typical bus mastership arbitration between a plurality of masters on a computer communication bus use a simple priority scheme or a round robin priority which provides an exclusive portion of the bus bandwidth to the various bus masters. A central processing unit (CPU) typically has the lowest priority in a system due to: (1) the CPU's ability to utilize the majority of bus bandwidth itself; (2) the CPU's ability to control the other bus masters; and (3) an assumption that the operations of the other bus masters which perform specialized functions are more important to the required system operation. However, in an interrupt driven system, there are instances wherein the CPU may need to increase its priority as compared with the other bus masters. As an example, consider a situation wherein a CPU receives a high priority interrupt request from a peripheral circuit module requiring immediate servicing. Such a situation may occur should a storage register begin to reach capacity or overflow. However, if the interrupt occurs when a direct memory access (DMA) controller is performing a long DMA block transfer of operands, the DMA is typically allowed to finish the currently executing operation in accordance with an established bus master priorization. As a result, the CPU may not be able to adequately service the interrupt. Other systems have attempted to limit DMA bus bandwidth utilization or have given all interrupts top priority within a system in order to balance the required needs of DMA bus mastership and interrupt service. However, such systems are not very application flexible and do not generally accommodate interrupts of varying importance.

SUMMARY OF THE INVENTION

Accordingly, it is an object of the present invention to provide an improved data processing system having a direct memory access controller which uses prioritized interrupts for varying communication bus mastership.

Another object of the present invention is to provide an improved interrupt method in a data processing system.

In carrying out the above and other objects of the present invention, there is provided, in one form, a data processing system and method of use for using prioritized interrupt requests to vary mastership of a communication bus within the system. A memory, a peripheral device, a central processing unit (CPU) and a direct memory access controller are coupled to the communication bus. The peripheral device selectively provides an interrupt request signal which indicates that a request is to be serviced. The central processing unit receives the interrupt request signal and selectively provides a level prioritized interrupt signal. The direct memory access controller controls access to the memory by being a master to the communication bus and selectively releases communication bus mastership in response to receipt of the level prioritized interrupt signal.

These and other objects, features, and advantages, will be more clearly understood from the following detailed description taken in conjunction with the accompanying drawings.

DETAILED DESCRIPTION OF THE INVENTION

Figure 1:
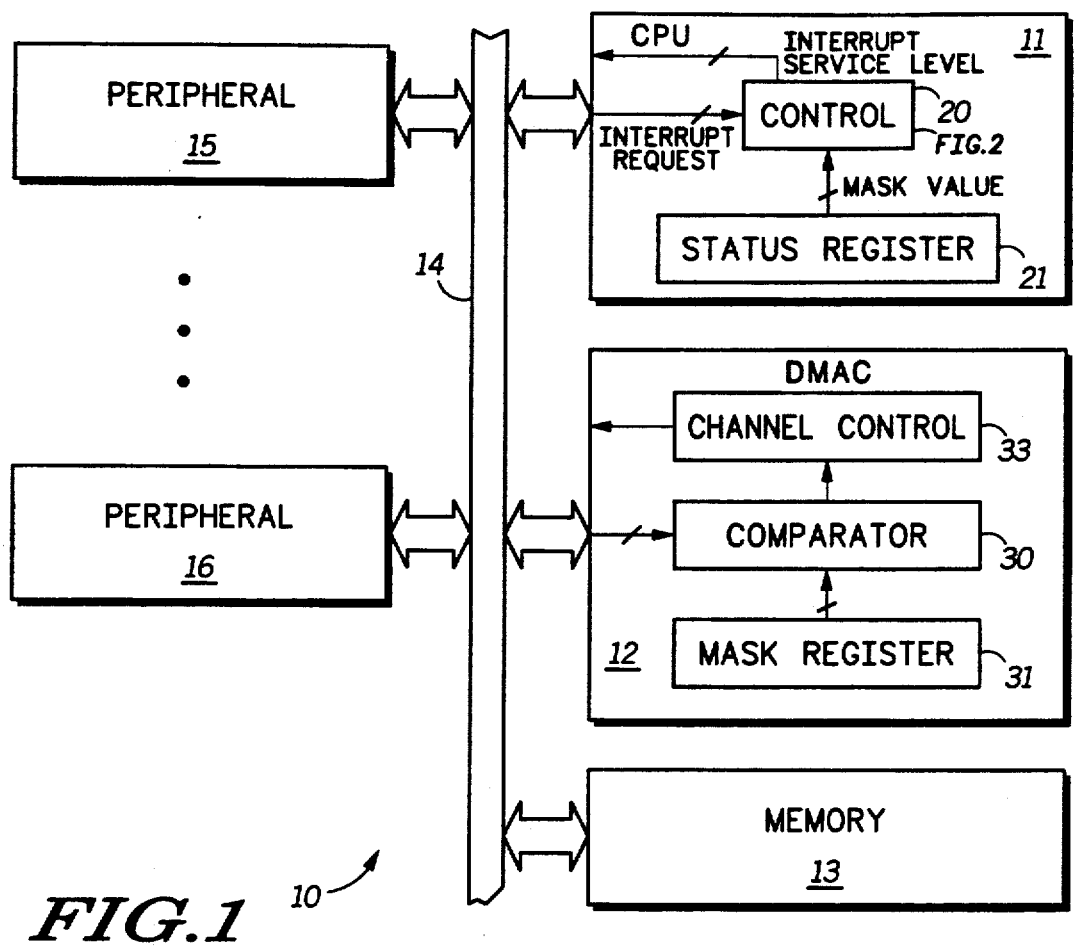
FIG. 1 illustrates in block diagram form is a data processing processing system using the present invention.

Shown in FIG. 1 is a block diagram of a data processing system 10 generally comprising a central processing unit (CPU) 11, a direct memory access controller (DMAC) 12, a memory 13, a communication bus 14, and a plurality of peripherals such as peripherals 15 and 16. Communication bus 14 is coupled to each of the general portions of system 10 mentioned above. Within a portion of CPU 11 is a control circuit 20 which receives an Interrupt Request signal via communication bus 14. A status register 21 is connected to control circuit 20 and provides a signal labeled "Mask Value". An output of control circuit 20 provides an Interrupt Service Level signal which is connected to communication bus 14. Within a portion of DMAC 12 is a comparator 30 which has a first input connected to communication bus 14 for receiving the Interrupt Service Level signal from CPU 11. A mask register 31 is connected to a second input of comparator 30. An output of comparator 30 is connected to an input of a channel control circuit 33. An output of channel control circuit 33 is connected to communication bus 14.

In operation, data processing system 10 functions to implement a variety of data processing operations. The CPU 11 performs a variety of functions including the execution of software and implementation of a variety of arithmetic calculations. The DMAC 12 functions to control the direct accessing of operands into and out of memory 13. Peripherals 15 and 16, along with others not shown, function to implement a variety of predetermined specialized tasks. Peripherals 15 and 16 of system 10 may either be located within a single integrated circuit or be embodied by circuitry external to an integrated circuit comprising CPU 11 and DMAC 12. To explain a possible mode of operation of system 10 when using the present invention, assume that DMAC 12 has bus mastership of communication bus 14 as determined by some predetermined bus mastership arbitration technique which is not relevant to the present invention. In such a context, CPU 11 is performing predetermined calculations and executing software. A block transfer of data is being controlled by DMAC 12 either out of or into memory 13. At some point in time during this described system operation, assume that peripheral circuit 15 provides an interrupt request signal to CPU 11. The interrupt request signal could be a request for servicing of an overflowing data buffer (not shown) within peripheral 15, for example. The interrupt request signal is provided as a priority ranked interrupt request signal. In other words, the interrupt request signal has a value which indicates the priority of the interrupt requested by peripheral 15. In one form, a priority from one to seven, which can be implemented with three bits, may be sued wherein a priority seven interrupt request is the highest priority and provides an indication to CPU 11 that peripheral 15 desires immediate servicing. The interrupt request signal is connected to control circuit 20 which also receives a mask value from status register 21. The mask value may represent either a previously received interrupt request of highest priority or a lowest level of interrupt that CPU 11 will recognize. The mask value can be controlled directly by software or is automatically set to the level of any currently serviced interrupt. Control circuit 20 functions to evaluate the priority of a newly received interrupt request with the previously established highest priority. The highest priority among the two priorities is outputted as the interrupt service level signal which indicates a level of urgency connected with the interrupt service request. Therefore, should an interrupt request be received having a priority which is lower than either a pending priority in status register 21 or a predetermined minimum priority acknowledged by CPU 11, the priority level of the interrupt service level signal outputted by CPU 11 does not change.

In the illustrated form, the DMAC 12 is also previously programmed with a mask value in mask register 31 which sets a predetermined priority level below which any lower priority interrupt service level signal will be ignored by DMAC 12. However, should an interrupt service level signal from CPU 11 having a priority higher than the priority stored in mask register 31 be received by DMAC 12, comparator 30 functions to indicate this by outputting a control signal to channel control circuit 33. When channel control circuit 33 receives a signal from comparator 30 indicating that a sufficiently high priority interrupt has been received from CPU 11, channel control circuit 33 of DMAC 12 functions to remove DMAC 12 as bus master from communication bus 14, thereby allowing CPU 11 to service peripheral 15. What DMAC 12 actually does to interrupt and/or preserve the operation which DMAC 12 was executing may vary but is not actually germane to the present invention and will not be described in further detail.

Figure 2:
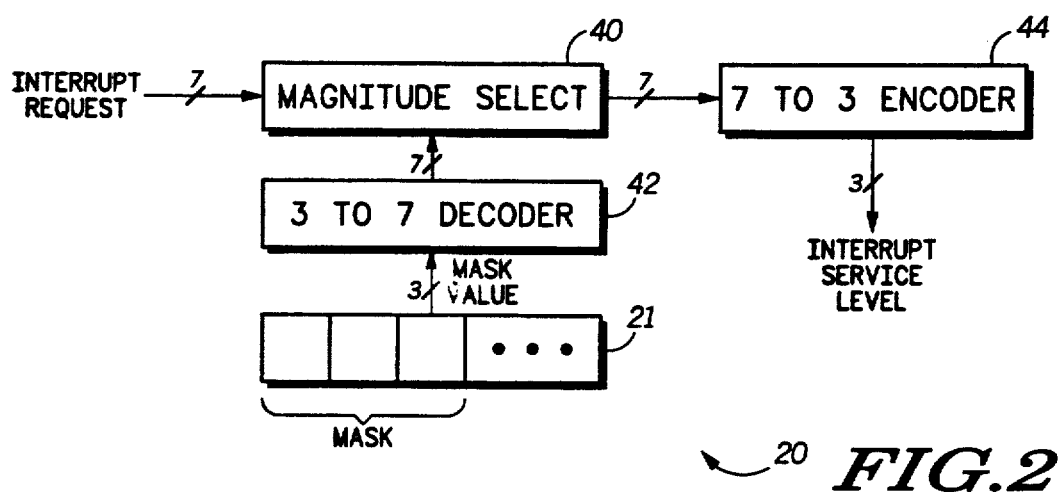
FIG. 2 illustrates in block diagram form a control circuit in the CPU of the data processing system of FIG. 1.

Shown in FIG. 2 is a block diagram of control circuit 20 of CPU 11. The interrupt request is shown as having one of seven values and being connected to an input of a magnitude select circuit 40. The seven values may also be implemented with three binary digits. Status register 21 of FIG. 1 is similarly numbered in FIG. 2 and is connected to an input of a three-to-seven decoder circuit 42. An output of decoder circuit 42 is connected to a second input of magnitude select circuit 40. An output of magnitude select circuit 40 is connected to an input of a seven-to-three encoder circuit 44. A three bit output of encoder 44 is outputted as the interrupt service level signal which can be used by comparator 30 to compare with three bits of mask register 31.

In operation, it should be well understood that although specific bit sizes are provided, the present invention is not limited to any particular bit size implementation. When an interrupt request signal is received by CPU 11, the interrupt request signal has a priority value as determined by the requesting peripheral 15. In the illustrated form, the priority may vary from a priority of one (least priority) to a priority of seven (highest priority). Status register 21 contains a register operand provided by CPU 11. A portion, such as three bits, or all of the operand may function as a mask value which is connected to decoder 42. As shown, decoder 42 functions to change the three-bit mask value into a corresponding seven-bit value which can be compared with the seven-bit interrupt request signal which is received by magnitude select circuit 40. Magnitude select circuit 40 outputs the seven-bit operand of the two received operands which has the largest magnitude. Encoder 44 then functions to change the selected seven-bit operand into a three-bit signal which represents the interrupt service level. The interrupt service level signal sent to DMAC 12 is a signal which contains a priority value of the interrupt request. Conventional control circuitry (not shown) within CPU 11 may function, if desired, to update status register 21 when appropriate with the highest priority value received. In another implementation status register 21 may be initialized or programmed to store a minimum threshold value below which no interrupt service level signal is sent to DMAC 12. This implementation may be embodied with either a single mask value or a plurality of mask values.

By now it should be apparent that there has been provided a DMAC which uses prioritized interrupts for the purpose of releasing bus mastership in a data processing system. The present invention provides an interrupt mechanism in a data processing system which allows the system to selectively acknowledge an interrupt request when the interrupt has a sufficiently high priority. The present invention may be utilized in a data processing system that services interrupt requests and which has multiple communication bus masters.

While there have been described hereinabove the principles of the invention, it is to be clearly understood to those skilled in the art that this description is made only by way of example and not as a limitation to the scope of the invention. Accordingly, it is intended, by the appended claims, to cover all modifications of the invention which fall within the true spirit and scope of the invention.

We claim:

1. A data processing system using prioritized interrupt requests for varying mastership of a communication bus therein, said system comprising:
   a memory coupled to the communication bus;
   a peripheral device coupled to the communication bus, said peripheral device selectively providing an interrupt request signal indicating a request to be serviced and containing priority information;
   a central processing unit coupled to the communication bus, said central processing unit receiving the interrupt request signal and selectively providing a prioritized bus interrupt signal in response to a first priority value signal stored in the central processing unit, the first priority value signal representing a minimum priority interrupt value below which the central processing unit will not service; and
   a direct memory access controller coupled to the communication bus, said direct memory access controller controlling access to the memory and selectively releasing communication bus mastership during said controlling in response to receipt of the prioritized bus interrupt signal, said direct memory access controller comprising a storage means having an output for providing a second priority value signal representing a minimum bus priority value establishing a bus priority value below which the direct memory access controller will not release bus mastership, and a comparator having a first input coupled to the communication bus for receiving the prioritized bus interrupt signal, a second input coupled to the output of the storage means for receiving the second priority value signal, and an output for providing a communication bus release signal in response to comparing a received prioritized bus interrupt signal with the second priority value signal and detecting that the second priority value signal has a lower priority value than the received prioritized bus interrupt signal.

2. The data processing system of claim 1 wherein said central processing unit further comprises:

control means having a first input for receiving the interrupt request signal, a second input, and an output for providing the prioritized bus interrupt signal; and storage means coupled to the second input of the control means, said storage means storing the first priority value signal representing a highest priority of any previously provided interrupt signals not yet processed by the system so that the central processing unit compares a priority of the interrupt request signal with the first priority value to provide and selects a highest priority from which to provide the direct memory access controller as the prioritized bus interrupt signal.

3. The data processing system of claim 2 wherein said control means further comprise:

a select circuit for determining a binary value of each of the interrupt request signal and the first priority value signal, the binary value representing each signal's priority, and selecting either the interrupt request signal or the first priority value signal as the bus prioritized interrupt signal depending upon which signal has a larger binary value.

4. The data processing system of claim 1 wherein said first priority value signal stored in the central processing unit is user programmable by a user of the data processing system.

5. In a data processing system, a method for varying communication bus mastership in response to prioritized interrupt requests, comprising the steps of:

providing a communication bus;

coupling a central processing unit, a memory, a direct memory access controller and at least one peripheral device to the communication bus;

generating and communicating a prioritized interrupt request signal from the peripheral device to the central processing unit, said interrupt request signal requesting servicing of the peripheral device by the central processing unit;

evaluating the interrupt request signal in the central processing unit by comparing a first priority of the interrupt request signal with a second priority stored in a storage device in the central processing unit, and communicating a prioritized bus interrupt signal to the direct memory access controller in response thereto, said bus interrupt signal representing a highest priority of any interrupt requests previously received by the central processing unit and not yet serviced; and preventing the direct memory access controller from accessing the communication bus only if the bus interrupt signal has a priority equal to or greater than a predetermined minimum third priority, thereby allowing the central processing unit to service the peripheral device.

6. The method of claim 5 wherein the step of preventing the direct memory access controller from accessing the communication bus further comprises:

using a storage register in the direct memory access controller, the storage register containing a priority value signal as the third priority.

7. A data processing system using a prioritized control signal for varying bus mastership of a communication bus therein, said system comprising:

a memory coupled to the communication bus;

a direct memory access controller coupled to the communication bus for controlling access to the memory by asserting bus mastership of the communication bus, said direct memory access controller selectively releasing bus mastership of the communication bus in response to a prioritized bus control signal only if the prioritized bus control signal is acknowledged by the direct memory access controller as having at least a first predetermined minimum priority; and a central processing unit coupled to the communication bus, said central processing unit providing the prioritized bus control signal to request a change in bus mastership, said central processing unit selectively providing the prioritized bus control signal in response to a second predetermined minimum priority stored in the central processing unit.

8. The data processing system of claim 7 wherein said second predetermined minimum priority is user variable by a user of the data processing system.

* * * * *